United States Patent [19]

Abraham et al.

[11] Patent Number: 4,952,468
[45] Date of Patent: Aug. 28, 1990

[54] STORAGE BATTERY HAVING A PROTECTIVE SHIELD

[76] Inventors: Carl J. Abraham, 3 Baker Hill Rd., Great Neck, N.Y. 11022; Malcolm Newman, 12 Beal Ct., Huntington, N.Y. 11743

[21] Appl. No.: 392,833
[22] Filed: Aug. 11, 1989
[51] Int. Cl.$^5$ .............................................. H01M 2/04
[52] U.S. Cl. ..................................... 429/175; 429/177
[58] Field of Search ........................ 429/175, 177, 122

[56] References Cited

U.S. PATENT DOCUMENTS

| | | | |
|---|---|---|---|
| 3,825,447 | 7/1974 | Kraals | 429/175 |
| 4,699,855 | 10/1987 | Abraham et al. | 429/175 |
| 4,770,958 | 9/1988 | Newman et al. | 429/177 |

Primary Examiner—Donald L. Walton
Attorney, Agent, or Firm—Levine Alan H.

[57] ABSTRACT

A storage battery provided with an inverted U-shaped cover located over the generally flat top wall of the battery casing. The ends of the cover are open so that the space between the cover and the top wall of the battery casing communicates with the atmosphere. The cover is sufficiently flexible so that a downward force on the cover, even when applied repeatedly, can substantially flatten the cover against the top wall of the casing without cracking the cover. The cover is also sufficiently resilient so that upon removal of the downward force, the cover can return to its original inverted U-shape even after being maintained in a flattened condition for a substantial period of time.

7 Claims, 2 Drawing Sheets

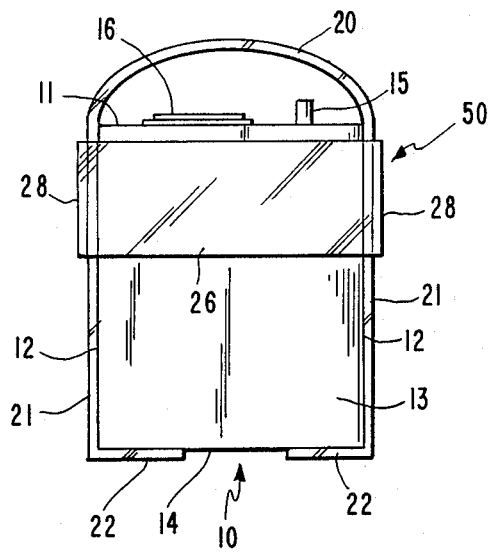
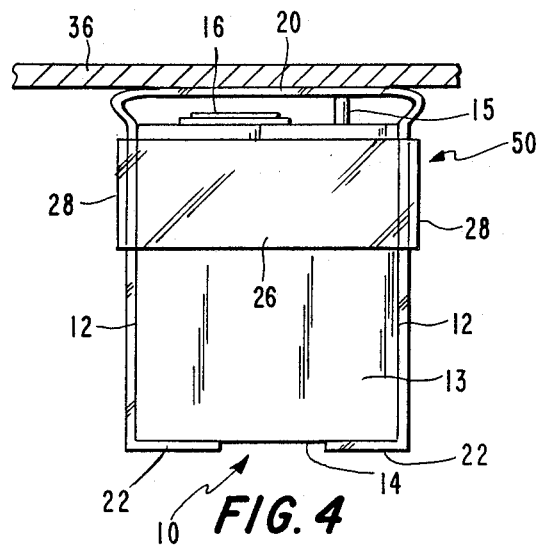

STORAGE BATTERY HAVING A PROTECTIVE SHIELD

This invention relates to storage batteries, and more particularly to protection in the event such a battery explodes.

Storage batteries, such as those used in most automobiles, comprise a number of electrolytic cells. The cells include metal electrodes and an electrolytic liquid, typically sulfuric acid. As a battery is used or stored, electrolysis of water occurs, producing hydrogen and oxygen gases which rise to continually occupy the ullage area within the battery casing, i.e., the volume within the casing located above the electrolytic liquid level. To limit the build-up of pressure within the casing resulting from the creation of the gases, it is common to provide the top wall of the battery casing with a vent cap located over each cell. The hydrogen and oxygen gases generated within the battery casing are vented to the atmosphere through the vent caps.

A problem presented by storage batteries involves the fact that an ignition source such as a spark or flame in the vicinity of the battery can ignite the hydrogen being vented, and often such emission can propagate back through the vent cap into the interior of the battery casing, resulting in an explosion of the hydrogen/oxygen mixture within the casing. In addition, sparks can be generated within the battery itself, such as by reason of a loose connection between an electrode and a conductor connected to it, thus setting off an explosion of the gases within the casing.

When an explosion occurs, the flame front expands rapidly away from the source of the explosion. The shock wave produced can have a speed exceeding 9000 feet per second, creating a pressure pulse exceeding 300 psi within a time duration of approximately 1.3 milliseconds. These phenomena can cause a rupture of the battery casing, and someone working near the battery is in danger of being hit by a fragment of the battery casing, and being sprayed with sulfuric acid from within the battery. The portions of the battery casing which usually fragment during explosion are the casing cover, and those portions of the casing walls and internal partitions located in the vicinity of the ullage area. The casing fragments produced by the explosion seldom weigh more than a few ounces, and they may travel at speeds ranging from 80 to 100 feet per second. Thus, they have the ability to cause serious harm to someone who is hit by such a fragment, particularly if the person is struck in the eye(s).

One way to minimize the danger of a battery explosion to the person working on or near the battery is by using protective shields of the type illustrated and described in U.S. Pat. Nos. 4,699,855 and 4,770,958. Use of a protective shield is based on the realization that completely preventing explosion of storage batteries will not be practically feasible within the forseeable future. In fact, the first of the above-identified patents refers to numerous patents which represent earlier attempts to eliminate explosions or to minimize their danger.

The protective shields of the above-identified patents include a cover located over the battery casing top wall so as to deflect both acid spray and pieces of the casing top wall which rise vertically from the battery, so as to prevent them from striking a person who is working over the battery. The cover has a generally inverted U-shape so that it projects above the generally flat top wall of the battery casing. This upward projection of the cover sometimes causes a problem due to space limitations in the the compartment containing the battery, such as the engine compartment of a modern automobile. For example, the shield cover over the battery may interfere with closing of the hood of an automobile in which the battery is installed. Moreover, the upwardly projecting shield may complicate stacking of batteries during storage and transportation of quantities of the batteries, since batteries with the protective shields may require more storage space than batteries without the shields.

Therefore, it is an object of the present invention to provide a protective shield for a battery which fully performs its function of preventing or minimizing the travel of acid spray bursting from an exploding battery, while eliminating problems due to space limitations above the battery, e.g., interference of the shield with closing of a car hood and stackability of batteries provided with such shields.

It is another object of the invention to provide such a protective a shield wherein the cover over the battery can be flattened down against the top wall of the battery casing, to permit closing of the hood of an automobile furnished with a battery having a protective shield and to permit stacking of the batteries on top of one another.

It is a further object of the invention to provide such a protective shield wherein when the downward force on the cover is removed, the cover can return from its flattened condition to its original condition spaced above the top wall of the battery casing.

Other objects and features of the invention will be apparent from the following description, in which reference is made to the accompanying drawings.

FIG. 3 is an end elevational view of the battery and shield when no downward force is applied to the shield cover; and FIG. 4 is a view similar to FIG. 3 showing a car hood closed on to the shield cover.

Figure 2:
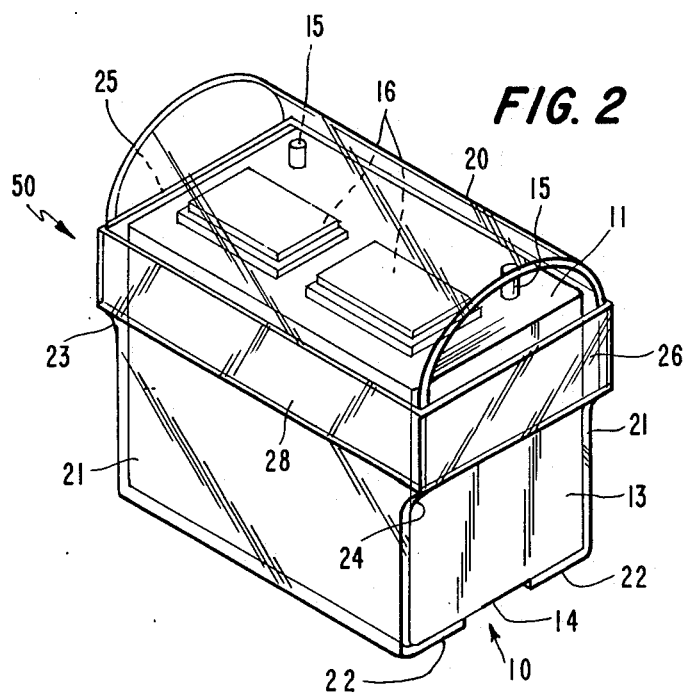
FIG. 2 is a perspective view of a storage battery having a protective shield according to this invention.

The embodiment chosen to illustrate the present invention, and shown in FIGS. 2 and 3, involves a storage battery 10 including an outer casing having a top wall 11, two side walls 12, two end walls 13, and a bottom wall 14. Upstanding on top wall 11 are two battery terminals 15, for connection to battery cable clamps, and two covers 16 which enclose gas venting means for the individual cells of the battery.

The protective shield chosen to illustrate the invention includes an inverted, generally U-shaped, in this case generally semi-elliptical-shaped, cover 20. Other inverted U-shapes could be used, such as an inverted channel shape or V-shape. The length of cover 20 should be such that it will completely cover and extend beyond the end walls 13, by means of extensions 23 and 24.

Depending from the longitudinal sides of cover 20 are side panels 21, each side panel being alongside one of the side walls 12 of the battery casing. At the lower edge of each side panel 21, a leg 22 extends beneath bottom wall 14 of the battery casing. Legs 22 serve to retain the protective shield on the battery. In this embodiment, cover 20, side panels 21, and legs 22 may be integrally formed of a single piece of molded plastic.

End shields 25 and 26 are supported between extensions 23 and 24, respectively. In the present example, the end shields are provided by means of a continuous band 50, which may be formed of a relatively rigid material, but preferably is formed of a flexible and resilient material, such as rubber or plastic. Alternately, the end shields 25 and 26 could be separate elements secured to the side panels 21, in the vicinity of extensions 23 and 24, in any suitable manner. In this example, band 50 is slipped over the cover 20 and on to extensions 23 and 24, to firmly surround side walls 12 and end walls 13 of the battery casing. The two long sides 28 of band 50 engage the side panels 21, and the shorter sides 25 and 26 of band 50, which are supported between extensions 23 and 24, respectively, define the end shields 25 and 26 spaced from end walls 13 of the battery casing.

The protective shield may be placed over the battery 10 by spreading side panels 21 away from each other so as to permit legs 22 to move downwardly along the side walls 12 of the battery and snap beneath bottom wall 14. This may be done before or after the end shields are applied to side panels 21.

As detailed in the two patents identified earlier, should battery 10 explode, cover 20 will prevent pieces of the battery casing, and spraying sulfuric acid, from reaching a person working over the battery. However, the pressure of the explosion is readily relieved, since it can flow longitudinally through the space between top wall 11 and cover 20 and out through the open ends of the cover, i.e., beyond the end edges of the cover. End shields 25 and 26 serve to reduce the severity of an explosion by causing the outwardly flapping battery casing end walls 13 to rebound toward the battery, thereby reducing fracture of the casing, reducing flying fragments and acid, and dissipating some of the energy of the explosion. The end shields also tend to deflect any horizontally moving fragments and acid produced by the explosion.

Figure 1:
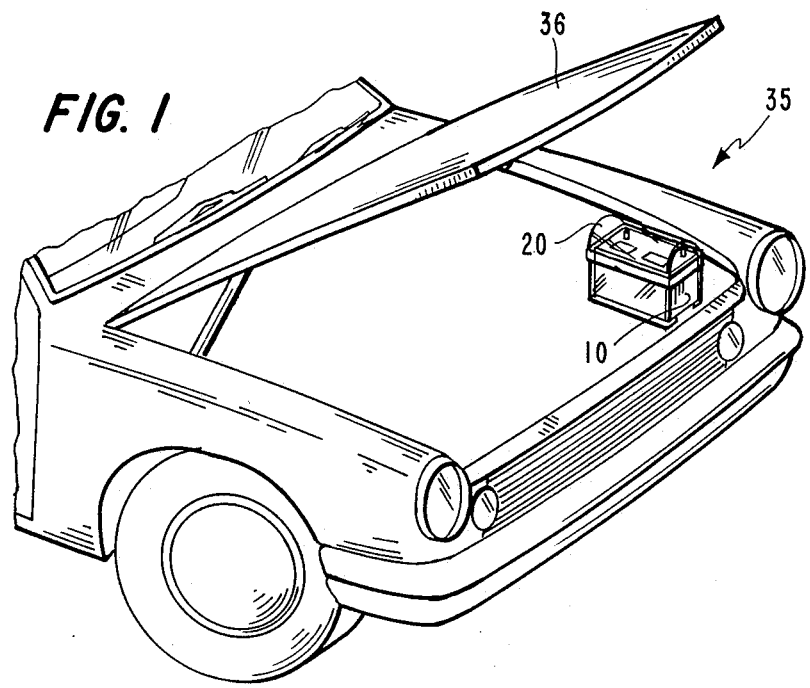
FIG. 1 is a fragmentary perspective view of the front end of an automobile, the hood being open to expose the engine compartment.

FIG. 1 illustrates battery 10, furnished with a protective shield including cover 20, seated in a typical battery well (not shown) within the engine compartment of an automobile 35. The hood 36 of the automobile is open, exposing the interior of the engine compartment. (The engine is not shown for the sake of convenience.)

It is not unusual, in some installations, for there to be very little headroom provided above the battery within a closed battery storage compartment. For example, as indicated in FIG. 4, cover 20 projects into and above the plane of the hood 36 when the latter is in its closed condition. Thus, if the cover 20 is made rigid, as contemplated in U.S. Pat. No. 4,699,855, the protective shield cannot be used, since it interferes with closing of hood 36. Moreover, the presence of rigid cover 20 may make stacking of batteries, for storage and shipment, somewhat difficult.

It was originally thought that the protective shield had to substantially retain its shape at all times in order for it to perform its protective function while withstanding the pressures generated when a battery explodes. However, in dealing with space problems caused by certain applications of the earlier versions of the shield, it has been found that shields made of tough, flexible, and resilient material serve as well or better than shields of more rigid material in containing the battery fragments and acid produced when a battery explodes..

Accordingly, the protective shield of the present invention is sufficiently flexible so that cover 20 can be flattened against the top wall 11 of the battery casing without adversely affecting the structural integrity of the cover. Thus, for example, as shown in FIG. 4, when the hood 36 of automobile 35 is closed, the flexibility of cover 20 allows the hood to flatten the cover against the top wall 11 of the battery casing. (As used herein, the term "top wall of the battery casing" is intended to include the top wall 11 itself or any element projecting up from the top wall, such as battery terminals 15 and gas venting cover 16.)

While the shield could be made of more than one piece suitably hinged together to provide flexibility, preferably, the shield is fabricated of a flexible and resilient plastic, such as low density polyethylene. While a material such a high density polyethylene is too stiff in many situations, a plastic having the characteristics of low density polyethylene admirably serves the purpose of the present invention. The cover 20, in addition to being flexible enough to be repeatedly flattened against the battery casing top wall (FIG. 4), must not crack when being so flattened. Also, the cover must be resilient enough so that when the flattening force is removed, e.g., hood 36 is opened, the cover springs back to its original condition (FIG. 3), i.e., it does not permanently set, or creep over time, into its flattened condition. Moreover, the cover must exhibit the behavior described above throughout a temperature range of at least minus thirty degrees centigrade ($-30°$ C.) to fifty degrees centigrade ($50°$ C.), the same temperature range throughout which lead acid storage batteries are typically required to perform.

The shield, especially cover 20, should have a thickness of between 1/32 inch and 3/16 inch. If the shield is too thin, it will not be rugged enough to withstand explosions or the accidental blows of tools. If the cover is to thick, it will not have sufficient flexibility to permit the requisite amount of deflection needed to allow automobile hoods to close and stacking of the batteries on top of one another.

For purposes of this invention, the requisite amount of deflection which cover 20 should have involves sufficient resiliency to permit its downward deflection, e.g., from its FIG. 3 condition to its FIG. 4 condition, of up to 75% of the span of the shield in the plane of top wall 11 of the battery casing. The "span" of the shield is the distance between the external faces of the two side walls 12 of the battery casing, which is seen in FIG. 3. This amount of deflection permits the cover to be spaced far enough above the battery 10, when undeflected, to permit the cover to successfully perform its function in the event of an explosion, and to be flattened down against the top wall of the battery casing when a downward force is applied to the cover.

The invention has been shown and described in preferred form only, and by way of example, and many variations may be made in the invention which will still be comprised within its spirit. For example, in the embodiments illustrated, and described above, the protective shield is a device formed independently of the battery and assembled therewith. However, the cover 20 and end shields 25 and 26 could be made integral with top wall 11 and/or other parts of the battery casing. It is understood, therefore, that the invention is not limited to any specific form or embodiment except insofar a such limitations are included in the appended claims.

We claim:

1. A storage battery comprising:
   an outer casing including a generally flat top wall, a cover located over the top wall, the cover having a generally inverted U-shape so as to define a space between the cover and top wall, the ends of the cover being open, and means for retaining the cover on the casing, characterized by:

the cover being sufficiently flexible so that it can be flattened against the top wall of the casing without adversely affecting the structural integrity of the cover.

2. A storage battery as defined in claim 1 wherein the cover is sufficiently resilient so that it can return to its original inverted U-shape even after being maintained in a flattened condition for a substantial period of time.

3. A storage battery as defined in claim 1 wherein the cover is sufficiently flexible and resilient so that it can be repeatedly flattened against the top wall of the casing without adversely affecting the structural integrity of the cover, and so that it can return to its original inverted U-shape even after being repeatedly flattened against the top wall of the casing.

4. A storage battery as defined in claim 1 wherein the cover has a generally semi-elliptical shape.

5. A storage battery as defined in claim 1 wherein the cover is made of a material having the characteristics of low density polyethylene.

6. A storage battery as defined in claim 1 wherein the cover has a thickness of between 1/32 and one 3/16 of an inch.

7. A storage battery as defined in claim 1 wherein the cover is sufficiently flexible and resilient to permit the cover to be deflected, toward the battery casing top wall, through a distance of as much as about 75% of the span of the cover without adversely affecting the structural integrity of the cover.

* * * * *